United States Patent [19]
Kothe et al.

[11] Patent Number: 6,131,605
[45] Date of Patent: Oct. 17, 2000

[54] AUTOMATIC DRAIN FOR FREIGHT CONTAINER

[75] Inventors: Horst Kothe, Betheln; Stephan Teepe, Elze, both of Germany

[73] Assignee: Waggonbau Elze GmbH & Co. Besitz KG, Elze, Germany

[21] Appl. No.: 08/982,665

[22] Filed: Dec. 2, 1997

[30] Foreign Application Priority Data

Dec. 2, 1996 [DE] Germany .......................... 196 49 864

[51] Int. Cl.[7] ............................. F16K 31/22; F16K 33/00
[52] U.S. Cl. ........................ 137/423; 137/397; 137/433
[58] Field of Search .................... 137/423, 429, 137/430, 433, 449, 192, 202, 397

[56] References Cited

U.S. PATENT DOCUMENTS

| | | | |
|---|---|---|---|
| 102,823 | 5/1870 | Jacobs | 137/433 |
| 859,540 | 7/1907 | Bonnell | 137/433 |
| 1,176,785 | 3/1916 | Stielow | 137/433 |
| 2,199,673 | 5/1940 | Ronning | 137/433 |
| 2,767,552 | 10/1956 | Clute | 137/433 |
| 2,920,644 | 1/1960 | Schulze et al. | 137/433 |
| 3,273,514 | 9/1966 | Bender | 137/433 |
| 3,620,240 | 11/1971 | Bogdanski | 137/202 |
| 3,759,281 | 9/1973 | Falcuta | 137/433 |
| 4,524,794 | 6/1985 | Haines | 137/423 |
| 4,640,304 | 2/1987 | Looney | 137/202 |
| 5,201,340 | 4/1993 | Teepe | 137/433 |
| 5,662,138 | 9/1997 | Wang | 137/433 |
| 5,782,258 | 7/1998 | Herbon | 137/202 |
| 5,915,408 | 6/1999 | Dudley | 137/244 |

*Primary Examiner*—George L. Walton
*Attorney, Agent, or Firm*—Herbert Dubno; Andrew Wilford

[57] ABSTRACT

A container having a floor with an upper inner face and a lower outer face is provided with a drain having a tubular housing extending between the faces and a partition formed with a hole, subdividing the housing into an upper compartment and a lower compartment, and forming at the hole an upper valve seat and a lower valve seat. Respective floatable upper and lower valve bodies in the compartments sealingly engageable with the respective valve seats. Thus with this system when the upper compartment fills with liquid it floats up the upper ball to unblock the hole in the partition and let this liquid drain out. If, however, water rises in the lower compartment, it will float up the lower ball to block the passage and prevent this liquid from flowing up through the passage into the container.

8 Claims, 3 Drawing Sheets

AUTOMATIC DRAIN FOR FREIGHT CONTAINER

FIELD OF THE INVENTION

The present invention relates to an automatic drain for a freight container. More particularly this invention concerns such a drain which lets liquid out of the container but that normally prevents entry of air back into it.

BACKGROUND OF THE INVENTION

It is known to ship, for example, produce in insulated freight containers to protect it thermally during transport. The contents of the container can frequently, however, sweat or generate liquid that collects on the floor of the container. This liquid cannot be allowed to pool as it will lead to mildew and rot problems.

Accordingly it is known from European 92 104023 to provide the floor of the container with a drain constituted as a tubular guide forming a passage that extends through an upwardly open valve seat. A floatable, that is lighter than water, ball is captured in the guide and can sit on the seat, normally blocking flow through it in either direction. When, however, water collects in the guide the ball floats up to unblock the passage and allow the water to drain out. Once the water is drained out the ball reseats and prevents, for example, cold air from blowing back in through the passage and freezing the contents of the freight container.

A problem with such a drain is that the base of the container is frequently exposed to considerable wetness. In fact on ship board it is possible in bad weather for the floor of the container to be actually submerged somewhat in sea water. In this case the ball floats up and water can enter the container, ruining the freight therein.

It has been suggested to provide a relatively tall structure with a rubber sleeve that closes to prevent such reentry, but this system has not proven itself effective in use. The sleeve is often damaged and/or torn off by handling of the freight container. In addition the structure is relatively tall and bulky so that it cannot readily be built, for example, into a standard-size cargo transcontainer.

OBJECTS OF THE INVENTION

It is therefore an object of the present invention to provide an improved automatic drain for a freight container.

Another object is the provision of such an improved automatic drain for a freight container which overcomes the above-given disadvantages, that is which is of small and simple construction and that prevents reentry of water into the container, even if the base of the container is fully submerged.

SUMMARY OF THE INVENTION

A container having a floor with an upper inner face and a lower outer face is provided with a drain having according to the invention a tubular housing extending between the faces and a partition formed with a hole, subdividing the housing into an upper compartment and a lower compartment, and forming at the hole an upper valve seat and a lower valve seat. Respective floatable upper and lower valve bodies in the compartments are sealingly engageable with the respective valve seats.

Thus with this system when the upper compartment fills with liquid it floats up the upper ball to unblock the hole in the partition and let this liquid drain out. If, however, water rises in the lower compartment, it will float up the lower ball to block the passage and prevent this liquid from flowing up through the passage into the container.

According to the invention a perforated guide sleeve removably and coaxially held in the housing carries the partition. The valve elements are retained in the guide sleeve. These valve bodies are lighter-than-water balls. The valve seats are complementarily shaped to the respective balls.

The housing in accordance with the invention has an upper end at the inner face and a lower end at the outer face. A tubular socket fixed in the floor coaxially receives the housing. The socket has a downwardly tapering lower end projecting from the floor and a radially projecting flange fixed to the floor.

According to the invention a cover formed with small-diameter throughgoing holes closes an upper end of the housing. The hole in the partition is of larger flow cross section than the holes of the cover so that foreign matter that can pass through the holes of the cover can easily pass through the hole of the partition.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
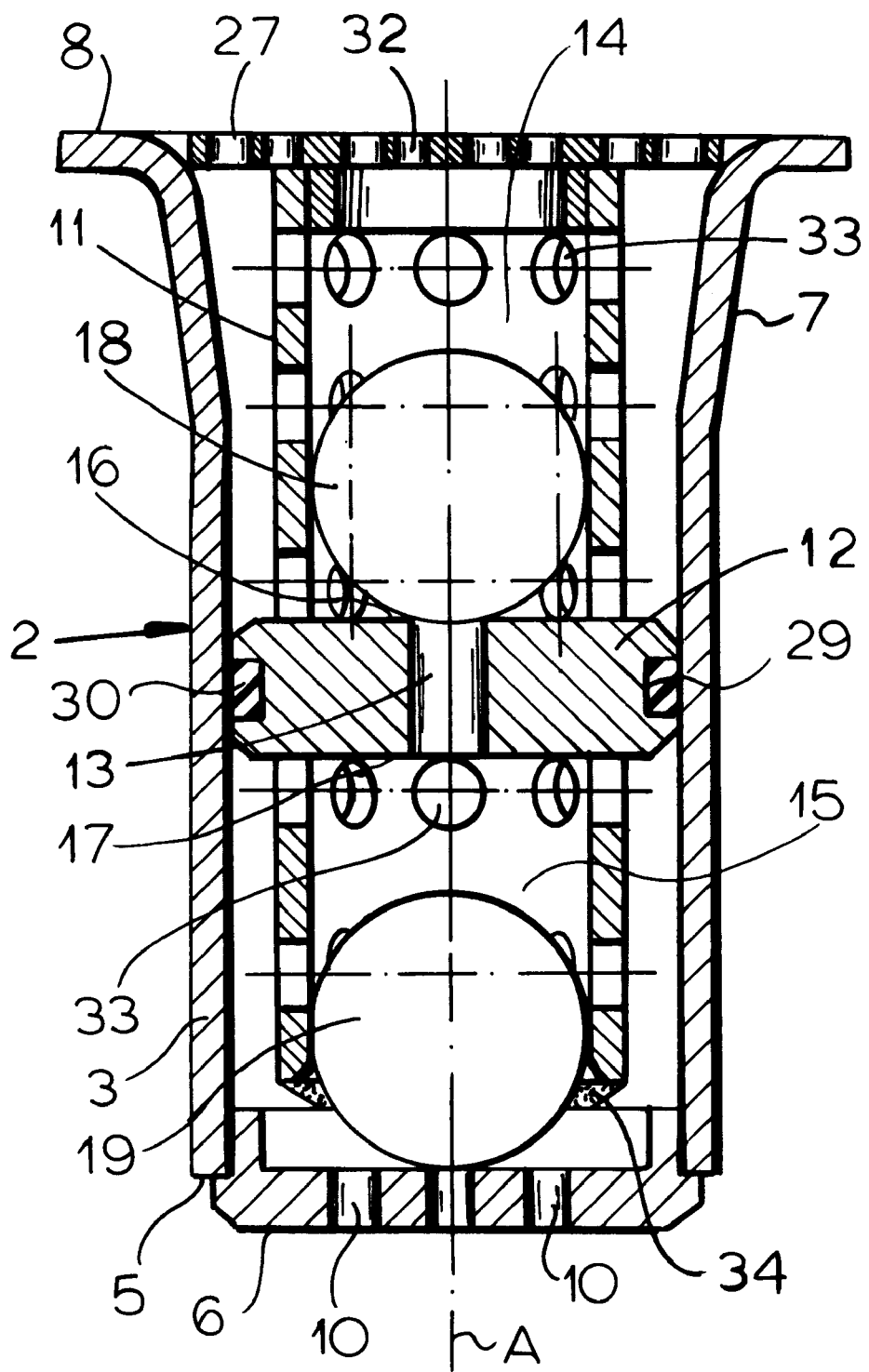
FIG. 1 is a vertical axial section through the drain according to the invention.
Figure 3:
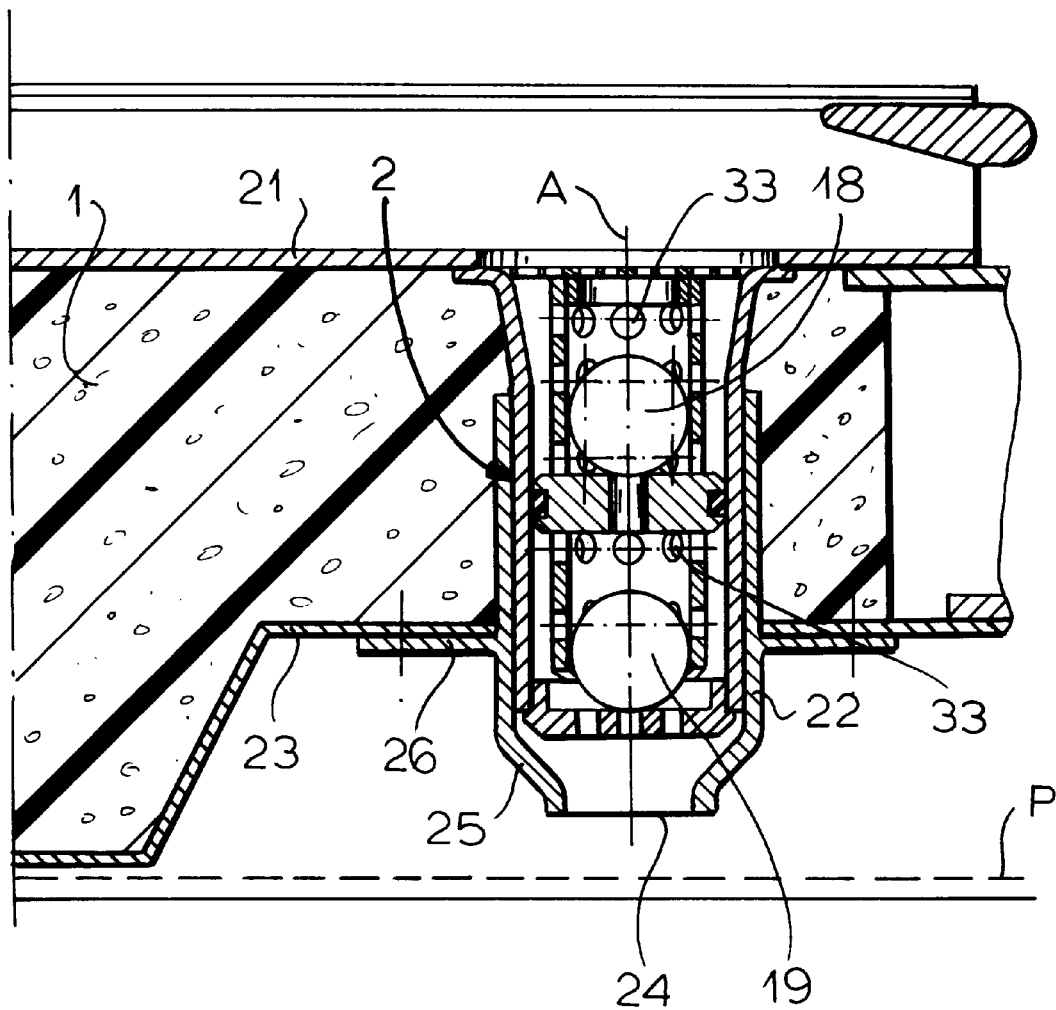
FIG. 3 is a vertical section through the drain of FIG. 1 in installed condition.

As seen in FIGS. 1 and 3 the drain according to the invention has a tubular housing 2 set in a container floor 1 and having a cylindrical lower portion 3 and a frustoconically flared upper portion 7 both centered on a vertical axis A. The lower portion 3 has a lower end 5 closed by a lower cover 6 formed with small-diameter throughgoing apertures or holes 10. The flared upper portion 7 has an outwardly directed annular flange 8 and is normally closed by an upper cover 27 formed with small-diameter throughgoing apertures or holes 32.

Figure 2:
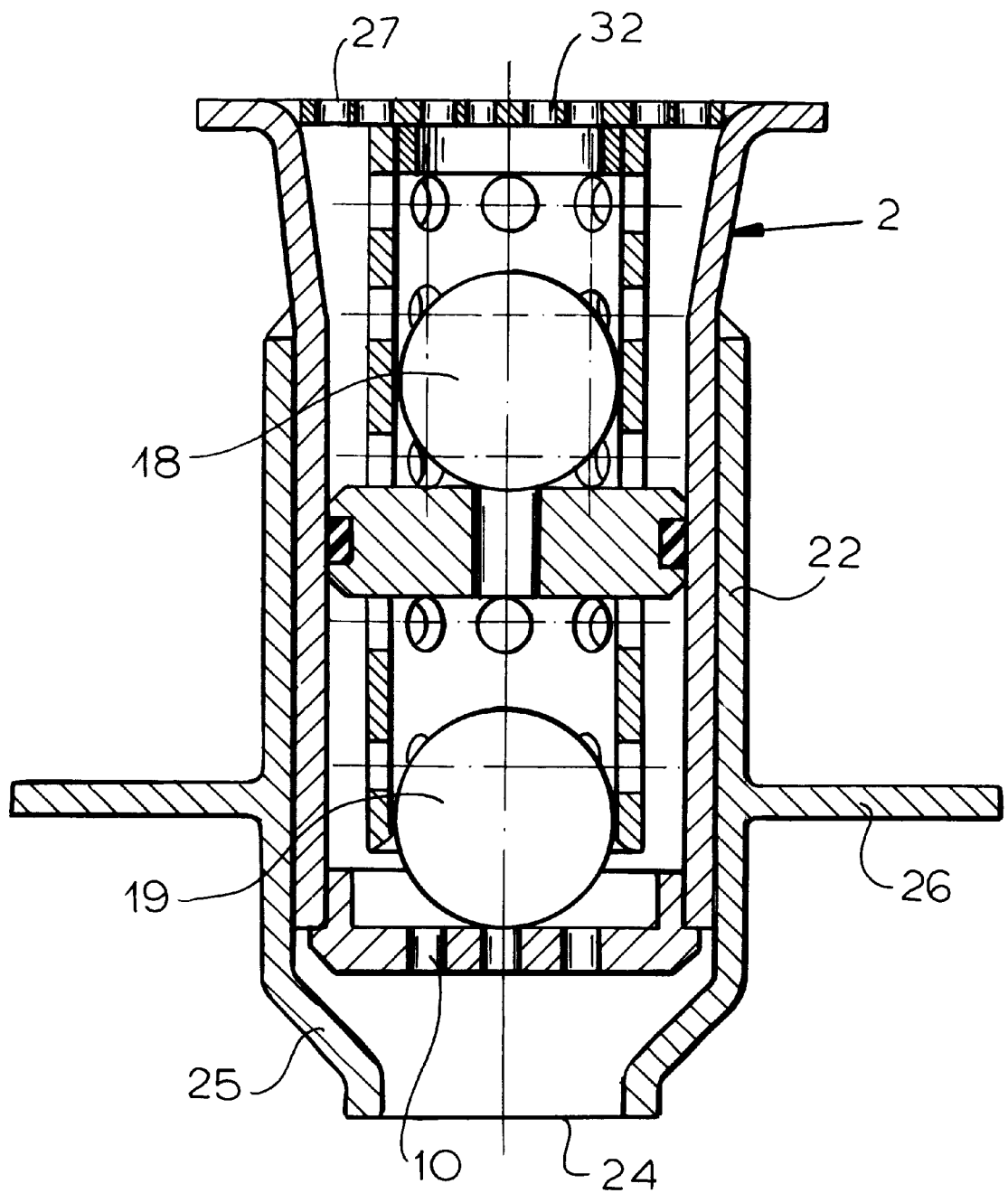
FIG. 2 is a view like FIG. 1 of a slightly different embodiment of the drain.

Coaxially inside the tubular housing 2 is a cylindrically tubular guide 11 formed with radially throughgoing large-diameter holes 33 and provided with a central crosswise partition disk 12 formed with a radially outwardly open groove 29 holding a seal ring 30 engaging an inner surface of the tubular lower portion 3 of the guide 2. This partition disk 12 subdivides the interior of the guide sleeve 11 into an upper compartment 14 and a lower compartment 15 and is formed with a central axially throughgoing hole 13 constituting the only fluid-communication passage between these compartments 14 and 15. An upper surface of the partition 12 forms around the hole 13 an upper seat 16 for a floatable valve element 18 here constituted as a hollow metal ball and a lower surface of the partition 12 forms around the hole 13 a lower seat 17 for an identical lower ball 19. A lower end of the guide tube 11 can be formed with an inwardly directed lip 34 (not provided in FIG. 2) to capture the lower ball 19 in the lower compartment 15.

The drain according to the invention is installed in a tubular plastic socket 22 having a flange 26 fixed to the lower skin 23 of the floor 1 of the freight container, and the flange 8 is secured underneath the upper skin 21 of this floor 1. The socket 22 has a downwardly frustoconically tapering end 25 and forms a downwardly open drain opening 24. Normally the skin 23 is set in at the drain to maintain the entire unit above a floor plane P on which the container sits.

Thus with the drain according to the invention any water collecting on top of the floor 1 will drain down through the holes 27 into the upper compartment 14 and cause the ball 18 to float up off the seat 16 so as to unblock the opening 13 and allow this liquid to drain out. If the container is sitting in a body of liquid, however, the ball 19 will be floated up to engage in the seat 17 and prevent any flow up through the hole 13 into the container.

Normally the socket 22 and housing 2 are installed in the container as it is built. Subsequently the works of the drain, namely the guide sleeve 11 with its partition disk 12 and the two balls 18 and 19, are installed in place with the upper cover 32 carried on the upper end of the sleeve 11. If there is no lip 34 as in FIG. 2 the system is assembled by dropping in the ball 19 then fitting in the sleeve 11 and ball 18. If the lip 34 is provided the entire core of the drain—the sleeve 11, partition 12, balls 18 and 19, and cover 33—can be installed and removed, e.g. for servicing, cleaning, or replacement, as a single unit.

We claim:

1. A freight container comprising:
    a floor with an inner upper skin and, spaced therebelow, a outer lower skin;
    a tubular housing having an outwardly projecting flange fixed to a lower face of the upper skin and projecting downward therefrom toward the lower skin;
    a tubular socket fixed to and protecting through the lower skin, fitting with the housing, and forming a downwardly open outlet;
    a partition disk formed with a hole, subdividing the housing into an upper compartment and a lower compartment, and forming at the hole an upper valve seat directed upward in the upper compartment and a lower valve seat directed downward in the lower compartment; and
    respective lighter-than-water upper and lower valve bodies freely vertically movable in the respective compartments and sealingly engageable with the respective valve seats, whereby water in the lower compartment will float the lower valve body up against the lower valve seat and close the hole and water in the upper compartment will float the upper valve body up off the upper valve seat and open the hole.

2. The freight-container drain defined in claim 1, further comprising
    a perforated guide sleeve removably and coaxially held in the housing and carrying the partition disk.

3. The freight-container drain defined in claim 2 wherein the valve elements are retained in the guide sleeve.

4. The freight-container drain defined in claim 1 wherein the valve seats are complementarily shaped to the respective balls.

5. The freight-container drain defined in claim 1 wherein the socket has a downwardly tapering lower end projecting from the floor and forming the outlet.

6. The freight-container drain defined in claim 1 wherein the socket is made of plastic.

7. The freight-container drain defined in claim 1 further comprising
    a cover formed with small-diameter throughgoing holes and closing an upper end of the housing.

8. The freight-container drain defined in claim 7 wherein the hole in the partition disk is of larger flow cross section than the holes of the cover, whereby foreign matter that can pass through the holes of the cover can easily pass through the hole of the partition disk.

* * * * *